United States Patent Office 2,777,004
Patented Jan. 8, 1957

2,777,004

PREPARATION OF HEXAFLUOROBUTADIENE FROM SYMMETRICAL DICHLORODIFLUORO-ETHYLENE

Robert P. Ruh, Ralph A. Davis, and Keith A. Allswede, Midland, Mich., assignors to The Dow Chemical Company, Midland, Mich., a corporation of Delaware No Drawing. Application June 24, 1953,
Serial No. 363,910

4 Claims. (Cl. 260—653)

This invention relates to an improved process for the preparation of hexafluorobutadiene.

Hexafluoro-1,3-butadiene, $CF_2=CF—CF=CF_2$, is said to exhibit the most interesting chemical behavior of any of the fluoroolefins (W. T. Miller, Jr., Technology of Fluorine Compounds, Slesser and Schram, National Nuclear Energy Series, VII–I, page 625). This unique perfluorodiolefin can be polymerized both to low molecular weight compounds useful for the preparation of the corresponding saturated fluorocarbon products and to high molecular weight rubbery polymers having good thermal stability. Unfortunately, however, no commercially practical methods have been developed for the synthesis of hexafluoro-1,3-butadiene. Of the two methods reported in the literature, one involves the thermal dimerization of chlorotrifluoroethylene at temperatures in excess of 500° C. while the other method involves the fluorine-catalyzed dimerization of symmetrical dichlorodifluoroethylene at temperatures of from −55° C. to about −80° C. Neither method gives an overall yield higher than about 30 percent. It is therefore apparent that a better method must be discovered for the preparation of hexafluoro-1,3-butadiene if this compound is to become commercially important. In fact, if a more convenient method can be developed for its synthesis, hexafluoro-1,3-butadiene may well become as important as tetrafluoroethylene (R. N. Haszeldine et al., Florine and Its Compounds, Methuen & Co. Ltd., page 108 (1951)).

It is therefore an object of this invention to provide an economical and convenient method for the preparation of hexafluoro-1,3-butadiene. A related object is to provide a new process whereby hexafluoro-1,3-butadiene can be prepared in good conversions and yields from symmetrical dichlorodifluoroethylene. Other objects and advantages are apparent from the following description which illustrates and discloses but does not limit the invention.

According to the present invention, hexafluoro-1,3-butadiene may be produced in good conversions and yields at moderate temperatures and pressures by a new process involving the steps of:

(1) Thermally dimerizing 1,2-dichloro-1,2-difluoroethylene to 1,3,4,4-tetrachloro-1,2,3,4-tetrafluorobutene-1.

(2) Chlorinating 1,3,4,4-tetrachloro-1,2,3,4-tetrafluorobutene-1 to 1,1,2,3,4,4-hexachloro-1,2,3,4-tetrafluorobutane.

(3) Fluorinating 1,1,2,3,4,4-hexachloro-1,2,3,4-tetrafluorobutane to 1,2,3,4-tetrachloro-1,1,2,3,4,4-hexafluorobutane.

(4) And dechlorinating the 1,2,3,4-tetrachloro-1,1,2,-3,4,4-hexafluorobutane to hexafluoro-1,3-butadiene.

These steps are illustrated by the following simplified chemical diagram:

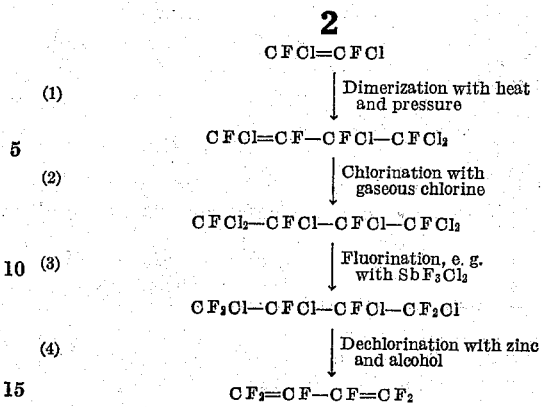

The dimerization step (1) may be carried out by heating $CFCl=CFCl$ in a closed vessel under its autogenous pressure at a temperature in the range of about 200° C. to about 400° C. for a time sufficiently long to bring about the desired degree of reaction as expressed by the following theoretical equation:

$$2CFCl=CFCl \xrightarrow[\text{pressure}]{\text{heat}} CFCl=CF—CFCl—CFCl_2$$

Almost any steel reaction vessel strong enough to contain the symmetrical dichlorodifluoroethylene at the temperature of the reaction is satisfactory as a reactor. Agitation is generally applied to the contents of the reaction vessel to maintain a uniform temperature throughout. Maximum conversion to the dimer $$CFCl=CF—CFCl—CFCl_2$$

may usually be obtained at a temperature between about 250° C. and 300° C. The optimum temperature of the reaction varies inversely with the length of the heating period, e. g., for comparably high conversions, a longer reaction time is required at 250° C. than at 300° C. Heating periods of from 5 to 20 hours or more may be employed, although long reaction times produce considerable amounts of high boiling material which lowers the overall yield of the desired product $$CFCl=CF—CFCl—CFCl_2$$

For both maximum conversions and yields, therefore, the symmetrical dichlorodifluoroethylene is usually heated at a temperature of about 275° C. while the pressure rises to a maximum value, e. g. approximately 1800 pounds per square inch gauge at 275° C., and then falls off to about 400 p. s. i. g. If the reaction product is rapidly cooled at the end of this heating period, usually no longer than about ten hours, the percentage of higher boiling material can be kept to a minimum, e. g. less than 10 weight percent. Under optimum conditions, the conversion and yield values for $CFCl=CF—CFCl—CFCl_2$ correspond to 77 percent and 87 percent respectively. As hereinafter used, these terms have the following meaning:

$$\text{Conversion} = \frac{\text{moles of product recovered}}{\text{moles of reactant charged}} \times 100$$

$$\text{Yield} = \frac{\text{moles of product recovered}}{\text{moles of reactant consumed}} \times 100$$

In the dimerization of $CFCl=CFCl$, the number of moles of product $CFCl=CF—CFCl—CFCl_2$ have, of course, to be multiplied by two in calculating conversion and yield values.

Following dimerization, the product $CFCl=CF-CFCl-CFCl_2$ is subjected to the chlorination step (2) of the process. This step is accomplished in the presence of actinic light, such as ultraviolet light or direct sunlight, by bubbling gaseous chlorine into liquid $CFCl=CF-CFCl-CFCl_2$ until approximately equimolecular proportions have reacted, i. e. until chlorine is no longer absorbed. The reaction proceeds substantially to completion according to the following equation:

$$CFCl=CF-CFCl-CFCl_2+Cl_2 \rightarrow$$
$$CFCl_2-CFCl-CFCl-CFCl_2$$

A glass flask or ceramic-lined vessel preferably equipped with a water-cooled reflux condenser may be employed as a reactor. The temperature at which this exothermic chlorination reaction may be carried out is not critical and temperatures between 20° C. and 100° C. are both convenient and practical. Although somewhat lower temperatures or even a temperature as high as the reflux temperature of the reaction mixture may be employed, no advantage appears to be derived by operating at such conditions.

The chlorinated product may be purified or employed per se in the fluorination step (3). This step is generally conducted in the liquid phase in a closed reaction vessel under the autogenous pressure of the reaction mixture employing a fluorinating agent such as antimony fluorohalide or antimony fluoride and chlorine. The fluorination may be accomplished in the vapor phase, as by means of HF and a catalyst such as chromium fluoride. However, liquid phase fluorination with a fluoride of antimony is usually preferred for best conversions and yields of the desired product. The antimony fluoride should preferably contain at least 5 percent by weight of pentavalent antimony and is desirably $SbF_3Cl_2$. In general, theoretical or slightly greater than theoretical proportions of fluorine and temperatures in the range of 150° to 350° C. are satisfactory when a fluoride of antimony is employed as the fluorinating agent. When approximately equimolecular proportions of $CFCl_2-CFCl-CFCl-CFCl_2$ and $SbF_3Cl_2$ are reacted to completion at 250° C. under conditions of good agitation, greater than 90 weight percent of the chlorofluorobutane reactant is fluorinated to $CF_2Cl-CFCl-CFCl-CF_2Cl$ according to the reaction:

$$CFCl_2-CFCl-CFCl-CFCl_2+SbCl_2F_3 \rightarrow$$
$$CF_2Cl-CFCl-CFCl-CF_2Cl$$

Following fluorination, the product $$CF_2Cl-CFCl-CFCl-CF_2Cl$$

is ordinarily purified and then subjected to the dechlorination step (4). This step may be accomplished with zinc in the presence of a lower alkanol under essentially anhydrous conditions. The alkanols which may advantageously be employed in the instant process are those having less than six carbon atoms per molecule, such as methanol, ethanol, isopropanol, sec-butanol, etc. Usually $CF_2Cl-CFCl-CFCl-CF_2Cl$ is dissolved in absolute ethanol and gradually added to a slurry of powdered zinc in absolute ethanol. A sufficiently large amount of zinc to react with essentially all of the chlorine atoms of the chlorofluoro-butane is generally employed, e. g. slightly greater than 2 atomic proportions of zinc per molecular proportion of $CF_2Cl-CFCl-CFCl-CF_2Cl$. The dechlorination reaction is highly exothermic and may be represented by the following equation:

$$CF_2Cl-CFCl-CFCl-CF_2Cl + 2Zn \xrightarrow{ethanol} CF_2=CF-CF=CF_2 + 2ZnCl_2$$

This step may be carried out in a glass flask or ceramic-lined vessel equipped with a water-cooled reflux condenser. The dechlorination proceeds quite rapidly at a temperature in the range of 20° to 100° C. and is conveniently conducted at the reflux temperature of the reaction mixture, i. e. approximately 80° C. when ethanol is the alcoholic solvent. The rate at which hexafluoro-1,3-butadiene is formed and liberated from the reaction vessel is roughly proportional to the rate of addition of the chlorofluorobutane reactant, i. e. dechlorination occurs almost instantaneously upon combining the reactants. Following addition of all the chlorofluorobutane, the reaction mixture is ordinarily heated for a short period of time to insure essentially complete reaction. The product hexafluoro-1,3-butadiene boils at about 6° C. and may be collected by condensation in a refrigerated receiver. The product so collected may be purified if desired by fractional distillation.

The various step-wise reactions of the instant process may be carried out in a consecutive manner without separating the desired reaction product of each step from the total organic product mixture prior to any subsequent reaction. For example, the total product from the dimerization step may be subjected to chlorination, the entire product from the chlorination step may be fluorinated, and the total organic product from the fluorination step may be dechlorinated without separating the organic reaction products of any step from start until finish. For best results, however, the desired product from each step of the process is preferably separated from the unconverted reactant and any other reaction products before being further reacted. In this manner, as will be observed from the example, high overall conversions and yields of the desired end-product, hexafluoro-1,3-butadiene, may be obtained.

The following example illustrates the process of the invention, but is not to be construed as limitative.

EXAMPLE

Hexafluoro-1,3-butadiene was produced from symmetrical dichlorodifluoroethylene according to the method hereinafter described:

*Dimerization of 1,2-dichloro-1,2-difluoroethylene*

A cylindrical 4-liter steel reaction vessel evacuated to 1 mm. mercury absolute pressure was cooled to below 10° C. and charged with 1645 grams (12.36 moles) of liquid 1,2-dichloro-1,2-difluoroethylene. The $$CFCl=CFCl$$

so charged was a mixture of cis and trans isomers boiling at approximately 22° C. Thereupon the steel reactor containing the symmetrical dichlorodifluoroethylene was rapidly heated to 275° C. and maintained at this temperature under conditions of good agitation throughout a heating period of about 6 hours' duration. During this time, the pressure in the sealed reactor rose to a maximum of 1920 pounds per square inch gauge. When the pressure fell off to about 400 p. s. i. g., heating was discontinued. The reaction was then quenched by rapidly cooling the reaction vessel and its contents below 100° C. Upon further cooling, e. g. to a temperature well below 20° C., the liquid reaction product weighing 1625 grams was removed and subjected to fractional distillation. In addition to 217 grams of the starting material $CHFl=CFCl$, there were obtained 1247 grams (4.69 moles) of dimeric $CFCl=CF-CFCl-CFCl_2$, 25 grams of an intermediate fraction boiling between the symmetrical dichlorodifluoroethylene and the dimer, and 136 grams of higher boiling material. Based on the moles of $CFCl=CFCl$ charged, this represents a conversion to $CFCl=CF-CFCl-CFCl_2$ of 75.9 mole percent and a total recovery of 98.8 weight percent. The yield of $CFCl=CF-CFCl-CFCl_2$ based on the $CFCl=CFCl$ consumed is 87.4 mole percent. The dimer fraction boiling at about 140° C. at 760 mm. mercury absolute was identified as $CFCl=CF-CFCl-CFCl_2$ by mass spectrometric and other analyses; bromination gave $CFCl_2-CFCl-CFBr-CFClBr$ while dechlorination with zinc and ethanol gave $CFCl=CF-CF=CFCl$. Since the dimer, CFCl=CF—CFCl—CFCl₂, has apparently not previously been isolated and identified, some its properties are listed as follows: B. P. 140.3° C. at 760.0 mm., 127.8° C. at 539.0 mm., 113.3° C. at 345.5 mm., 89.6° C. at 153.4 mm. (Hg. abs.); F. P.—121.6° C. (becomes glassy); $n_D^{25}$ 1.4253; $d_4^{25}$ 1.69015.

*Chlorination of 1,3,4,4-tetrachloro-1,2,3,4-tetrafluorobutene-1*

Into a 2-liter glass flask equipped with a reflux condenser was charged 1488 grams (5.6 moles) of CFCl=CF—CRCl—CFCl₂ prepared from a number of runs as described above. Gaseous chlorine was rapidly bubbled into the liquid tetrachlorotetrafluorobutene-1 under exposure to direct sunlight. At the end of about 3 hours, approximately the theoretical quantity of chlorine had reacted. Upon fractional distillation of the reaction product there was obtained 51 grams (0.19 mole) of unreacted CFCl=CF—CFCl—CFCl₂ and 1813 grams (5.38 moles) of CFCl₂—CFCl—CFCl—CFCl₂ boiling at 204° C. at 745 mm. mercury absolute. Based on the moles of CFCl=CF—CFCl—CFCl₂ charged, this represents a conversion to CFCl₂—CFCl—CFCl—CFCl₂ of 96.1 mole percent and a total recovery of 99.5 mole percent. The yield of CFCl₂—CFCl—CFCl—CFCl₂ based on the CFCl=CF—CFCl—CFCl₂ consumed is 99.4 mole percent.

*Fluorination of 1,1,2,3,4,4-tetrachloro-1,2,3,4-tetrafluorobutane*

Approximately 22927 grams (68.0 moles) of CFCl₂—CFCl—CFCl—CFCl₂ prepared in several runs according to the above procedure and 17050 grams (68.2 moles) of SbF₃Cl₂ were charged into a 5 gallon steel reaction vessel. The reaction mixture so charged was heated to 250° C. and maintained at this temperature under conditions of good agitation for the duration of the heating period. At the end of about 5 hours, the organic reaction product was cooled, washed with water to remove antimony salts, and dried with anhydrous calcium sulfate. Thereupon, the dry product weighing 19,568 grams was fractionally distilled and the following fractions were obtained:

| Boiling range 739-740 mm. Hg abs. | Empirical Formula | Grams | Mole percent |
|---|---|---|---|
| 34°–35° C | C₄ClF₉ | 76 | 0.3 |
| 64°–68° C | C₄Cl₂F₈ | 75 | 0.4 |
| 94°–96° C | C₄Cl₃F₇ | 17 | 0.1 |
| 133° C | C₄Cl₄F₆ | 17,900 | 86.6 |
| 168° C | C₄Cl₅F₅ | 742 | 3.4 |
| Intermediate fractions | | 664 | |

The C₄Cl₄F₆ fraction boiling at 133° C. at 740 mm. mercury absolute was identified as CF₂Cl—CFCl—CFCl—CF₂Cl Based on the CFCl₂—CFCl—CFCl—CFCl₂ charged, a conversion to CF₂Cl—CFCl—CFCl—CF₂Cl of 86.6 mole percent and a total recovery of 90.8 mole percent were obtained. Calculated on a basis of the CFCl₂—CFCl—CFCl—CFCl₂ consumed, the yield of CF₂Cl—CFCl—CFCl—CF₂Cl was 89.6 mole percent.

The C₄Cl₅F₅ fraction boiling at 168° C. at 739 mm. mercury absolute was found to be CF₂Cl—CFCl—CFCl—CFCl₂

By dechlorination of this compound with zinc and alcohol, there was obtained a diolefinic C₄ClF₅ compound boiling at 35°–38° C. at 745 mm. mercury absolute which was subsequently identified as CFCl=CF—CF=CF₂

*Dechlorination of 1,2,3,4-tetrachloro-1,1,2,3,4,4-hexafluorobutane*

Into a 5-liter glass flask equipped with a dropping funnel, reflux condenser, and mechanical stirring device and containing 1430 grams (22 moles) of powdered zinc, was gradually added 2606 grams (8.56 moles) of the CF₂Cl—CFCl—CFCl—CF₂Cl prepared as above dissolved in 4100 ml. of absolute ethanol. Addition required a period of 6 hours, the rate of addition being such as to maintain a steady reflux of the absolute ethanol. During this time, gaseous CF₂=CF—CH=CF₂ was continually given off by the reaction mixture. This normally gaseous compound passed out of the reaction flask through a water-cooled reflux condenser and into a refrigerated trap where it was collected as a liquid. When all of the alcoholic solution of CF₂Cl—CFCl—CFCl—CF₂Cl had been added to the flask, the reaction mixture was heated under reflux for a short period of time. Fractional distillation of the product liquid in the cold trap gave 1251 grams (7.72 moles) of CF₂=CF—CF=CF₂ (structure confirmed by vapor density determination and bromination to CF₂Br—CFBr—CFBr—CF₂Br). There was also obtained 70 grams (0.3 mole) of an unidentified dichlorohexafluorobutene having one of the following structural formulas, viz. CF₂=CF—CFCl—CF₂Cl or CF₂Cl—CF=CF—CF₂Cl. Based on the moles of CF₂Cl—CFCl—CFCl—CF₂Cl charged, the above data represent a conversion to CF₂=CF—CF=CF₂ of 90.2 mole percent and a total recovery of 93.7 mole percent. The yield of CF₂=CF—CF=CF₂ based on the CF₂Cl—CFCl—CFCl—CF₂Cl consumed is 93.5 mole percent.

These results represent an overall yield for the production of the final product CF₂=CF—CF=CF₂ from the initial CFCl=CFCl reactant consumed of greater than 72 mole percent.

That which is claimed is:

1. A process for the preparation of hexafluoro-1,3-butadiene which comprises fluorinating 1,1,2,3,4,4-hexachloro-1,2,3,4-tetrafluorobutane to 1,2,3,4-tetrachloro-1,1,2,3,4,4-hexafluorobutane and dechlorinating this latter compound with zinc in the presence of alcohol to obtain hexafluoro-1,3-butadiene.

2. A process for the preparation of hexafluoro-1,3-butadiene which comprises chlorinating 1,3,4,4-tetrachloro-1,2,3,4-tetrafluorobutene-1 to 1,1,2,3,4,4-hexachloro-1,2,3,4-tetrafluorobutane, fluorinating 1,1,2,3,4,4-hexachloro-1,2,3,4-tetrafluorobutane to 1,2,3,4-tetrachloro-1,1,2,3,4,4-hexafluorobutane, and dechlorinating this latter compound to hexafluoro-1,3-butadiene with zinc in the presence of a lower alkanol under essentially anhydrous conditions.

3. A process for the preparation of hexafluoro-1,3-butadiene which comprises heating 1,2-dichloro-1,2-difluoroethylene in a closed vessel at a temperature in the range of 200° to 400° C. for a time sufficiently long to form 1,3,4,4-tetrachloro-1,2,3,4-tetrafluorobutene-1, chlorinating the 1,3,4,4-tetrachloro-1,2,3,4-tetrafluorobutene-1 to 1,1,2,3,4,4-hexachloro-1,2,3,4-tetrafluorobutane, fluorinating the 1,1,2,3,4,4-hexachloro-1,2,3,4-tetrafluorobutane to 1,2,3,4-tetrachloro-1,1,2,3,4,4-hexafluorobutane and dechlorinating this latter compound to hexafluoro-1,3-butadiene with zinc in the presence of a lower alkanol under essentially anhydrous conditions.

4. In a process for preparing hexafluoro-1,3-butadiene whereby 1,2-dichloro-1,2-difluoroethylene is converted to 1,2,3,4-tetrachloro-1,1,2,3,4,4-hexafluorobutane and this latter compound is dechlorinated to hexafluoro-1,3-butadiene, the steps which comprise first heating 1,2-dichloro-1,2-difluoroethylene in a closed vessel at a temperature in the range of from about 200° C. to about 400° C. for a time sufficiently long to form 1,3,4,4-tetrachloro-1,2,3,4-tetrafluorobutene-1, chlorinating the 1,3,4,4-tetrachloro-1,2,3,4-tetrafluorobutene-1 to 1,1,2,3,4,4-hexachloro-1,2,3,4-tetrafluorobutane, and fluorinating the 1,1,2,3,4,4-hexachloro-1,2,3,4-tetrafluorobutane to 1,2,3,4-tetrachloro-1,1,2,3,4,4-hexafluorobutane.

References Cited in the file of this patent

Preparation, Properties and Technology of Fluorine and Organic Fuorine Compounds, Slesser and Schram, page 676 (1951).